United States Patent [19]

Okayama et al.

[11] Patent Number: 5,086,349

[45] Date of Patent: Feb. 4, 1992

[54] OPTICAL SWITCHING SYSTEM WHICH EMPLOYS REFERENCE BEAMS WITH DIFFERENT WAVELENGTHS

[75] Inventors: Hideaki Okayama; Toshimasa Ishida, both of Tokyo, Japan

[73] Assignee: Oki Electric Industry Co., Ltd., Tokyo, Japan

[21] Appl. No.: 557,630

[22] Filed: Jul. 24, 1990

[30] Foreign Application Priority Data

Jul. 26, 1989 [JP] Japan ............................ 1-93215

[51] Int. Cl.⁵ .......................................... H04J 1/00
[52] U.S. Cl. .................................. 359/124; 359/128; 359/135
[58] Field of Search ............... 370/3, 1, 214; 455/606, 455/607, 612, 616

[56] References Cited

U.S. PATENT DOCUMENTS

| | | | |
|---|---|---|---|
| 3,752,992 | 8/1973 | Fluhr | 455/611 |
| 3,912,876 | 10/1975 | Muller | 370/3 |
| 4,530,084 | 7/1985 | Strebel et al. | 455/607 |
| 4,715,028 | 12/1987 | McMahon et al. | 370/3 |
| 4,730,301 | 3/1988 | McMahon | 455/607 |
| 4,742,576 | 5/1988 | McMahon | 485/617 |
| 4,759,011 | 7/1988 | Hicks, Jr. | 455/607 |
| 4,845,703 | 7/1989 | Suzuki | 370/3 |

FOREIGN PATENT DOCUMENTS 159929 7/1987 Japan.

OTHER PUBLICATIONS

Kobayashi, "Future Trends of Photonic Switching Systems", Inst. of Elect., Info. & Comm. Eng. of Japan, Tech. Res. Rept. OQE 87-167, Feb. 11, 1988, pp. 53-56.
Cochrane et al, "Future Optical Fiber Transmission Technology and Networks", IEEE Comm. Mag., Nov. 1988, pp. 45-70.

*Primary Examiner*—Reinhard J. Eisenzopf
*Assistant Examiner*—Kinfe-Michael Negash
*Attorney, Agent, or Firm*—Spencer & Frank

[57] ABSTRACT

An optical switching system has an optical transmission path for propagating signal beams, and a plurality of optical nodes for transmitting and receiving the signal beams. A reference beam source generates reference beams each having a particular wavelength. Each optical node generates a plurality of signal beams which are tuned to the wavelengths associated with the reference beams.

14 Claims, 11 Drawing Sheets

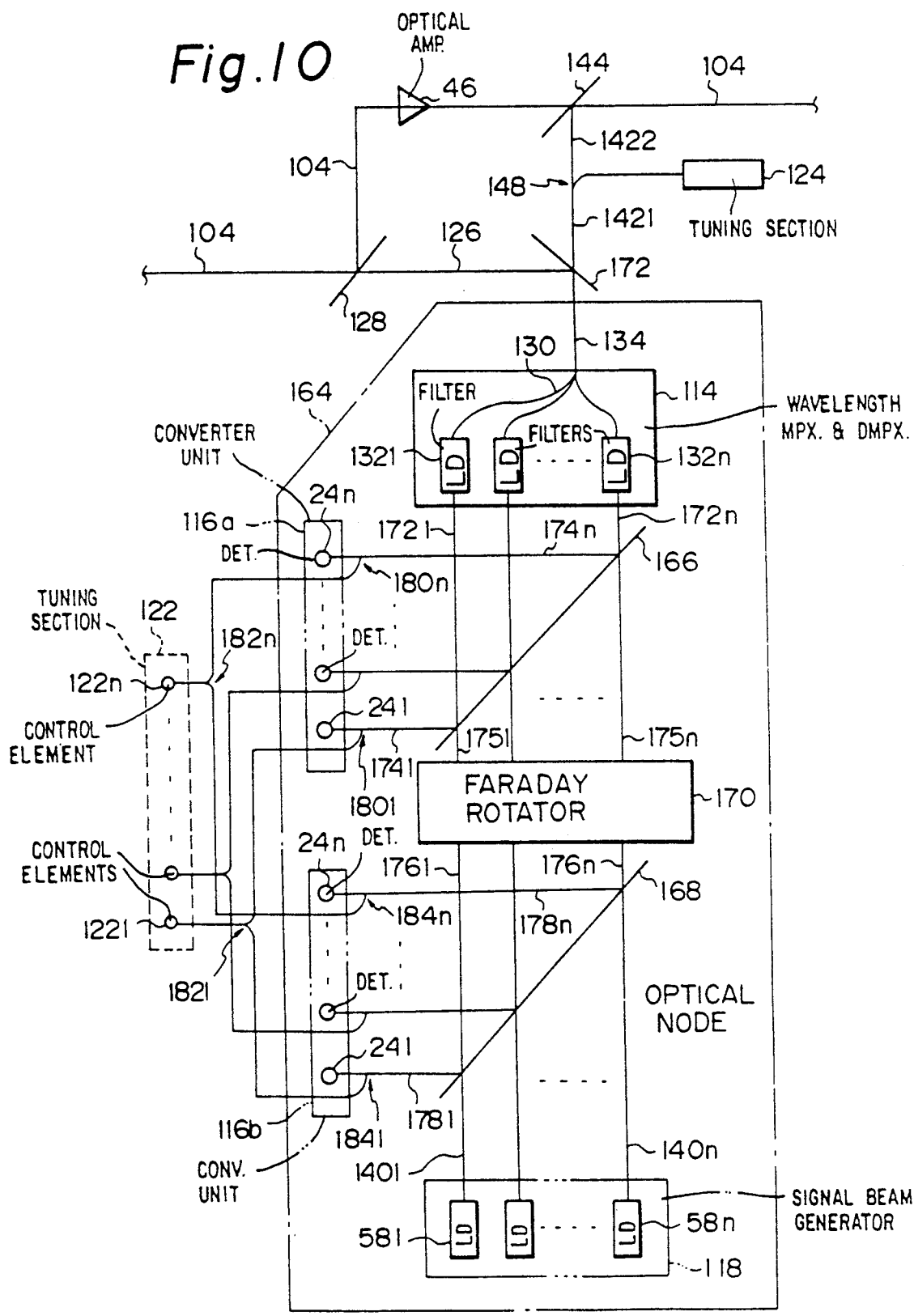

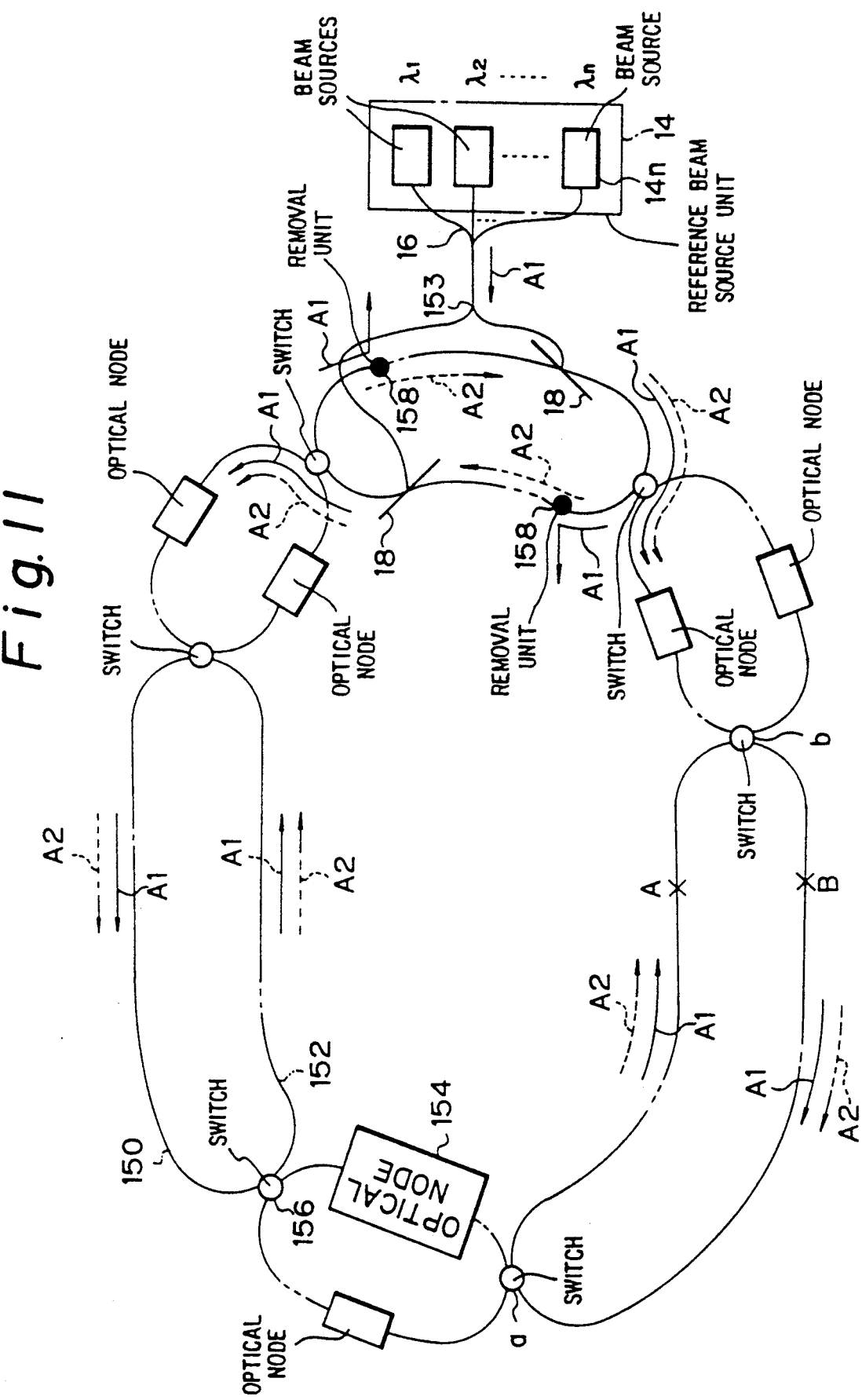

5,086,349

OPTICAL SWITCHING SYSTEM WHICH EMPLOYS REFERENCE BEAMS WITH DIFFERENT WAVELENGTHS

BACKGROUND OF THE INVENTION

1. Field of the Invention

The present invention relates to an optical switching system and, more particularly, to an optical switching system advantageously applicable to an optical local area network.

2. Description of the Prior Art

An optical switch is a promising substitute for an electronic switching system in the communication systems art. An optical switching system having an optical transmission path for propagating signal beams and a plurality of optical nodes optically connected to the path for interchanging the signal beams is now under study for implementing an optical communication system. Use may be made of signal beams having a single wavelength or multiplexed wavelengths. Such an optical switching system is disclosed in, for example, Ikutaro Kobayashi "Future Trends of Photonic Switching Systems", the Institute of Electronics, Information and Communication Engineers of Japan, Technical Research Report, Optics and Quantum Electronics Study Meeting, OQE 87-167, pp. 53–56 Feb. 22, 1988). Peter Cochrane et al outlines the past optical systems using optical fibers and the development of future passive optical networking in "Future Optical Fiber Transmission Technology and Networks", IEEE Communications Magazine, November 1988, pp. 45–70. A method and an apparatus for optical communication of the kind using coherent detection is taught in Japanese Patent Laid-Open Publication No. 159929/1987, corresponding to U.S. patent application Ser. No. 815,073, now U.S. Pat. No. 4,742,576 filed on Dec. 23, 1985 in the name of Donald H. MacMahon (now U.S. Pat. No. 4,742,576).

A switching system of the type using signal beams having a single wavelength has the drawback that the transmission capacity available therewith is limited. The problem with an optical switching system using signal beams having multiplexed wavelengths heretofore proposed is that closely spaced wavelengths are not achievable because the wavelength of the signal beam to be generated differs from one node to another. This prevents the number of channels and, therefore, the transmission capacity, from being increased because the wavelength range available with an optical fiber constituting an optical transmission path is limited.

SUMMARY OF THE INVENTION

It is therefore an object of the present invention to provide an optical switching system with which a greater transmission capacity is attainable.

An optical switching system in accordance with the present invention has an optical transmission path for propagating signal beams therethrough, and a plurality of optical nodes each for transmitting and receiving the signal beams. A reference beam source generates reference beams each having a particular wavelength. The optical nodes each generate a plurality of signal beams, each being tuned to a respective one of the wavelengths associated with the wavelengths of the reference beams.

BRIEF DESCRIPTION OF THE DRAWINGS

The objects and features of the present invention will become more apparent from the consideration of the following detailed description taken with the accompanying drawings, in which:

FIG. 10 is a schematic block diagram showing a sixth embodiment of the present invention; and FIG. 11 is a schematic block diagram showing a seventh embodiment of the present invention.

DESCRIPTION OF THE PREFERRED EMBODIMENTS

Preferred embodiments of the optical switching system in accordance with the present invention will be described in detail below with reference to the accompanying drawings.

FIRST EMBODIMENT

Figure 1:
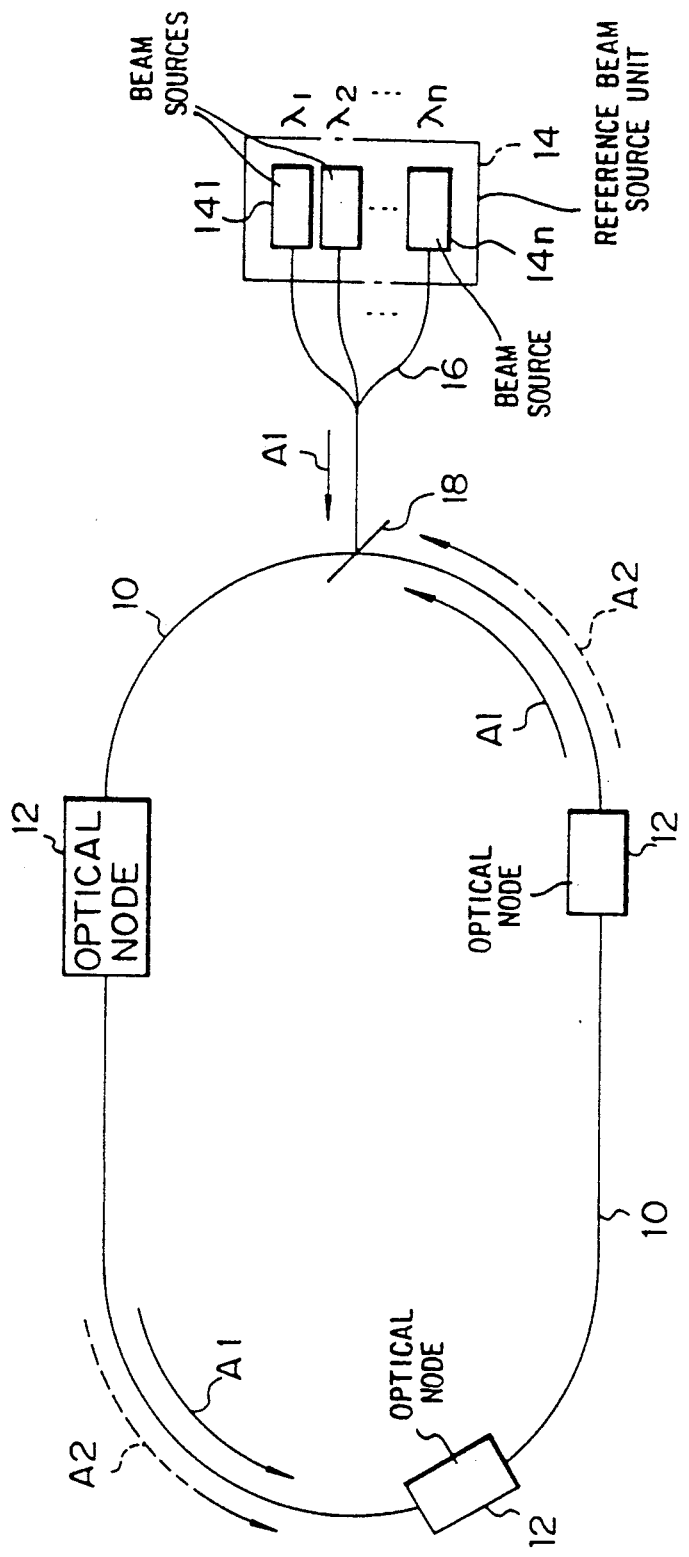
FIG. 1 is a schematic block diagram showing a first embodiment of the optical switching system in accordance with the present invention.

Referring to FIG. 1, an optical switching system embodying the present invention is shown and has an optical transmission path 10 through which signal beams may be propagated. A plurality of optical nodes 12 are distributed on the transmission path 10, each for transmitting and receiving the signal beams over the path 10. A reference beam source unit 14 emits a plurality of reference beams each having a particular wavelength. The optical nodes 12 each outputs a plurality of signal beams, each being tuned to respective one of the wavelengths of the reference beams.

Specifically, the optical transmission path 10 has a closed loop configuration and propagates reference beams and signal beams polarized in different directions from each other therethrough while preserving their directions of polarization. Implemented with PAND type polarization preserving optical fibers, for example, the transmission path 10 propagate reference beams and signal beams which have been polarized substantially perpendicularly to each other.

The reference beam source unit 14 has a plurality of beam sources 14*l* to 14*n* which emit reference beams having wavelengths $\lambda_1$ to $\lambda_n$, respectively. The reference beams $\lambda_1$ to $\lambda_n$ have different wavelengths, but they are polarized substantially in the same direction.

The beam sources 14l to 14n are optically coupled in the transmission path 10 by combining means 16 and 18. The combining means 16 comprises 1×n branches for preserving the direction of polarization of beams and multiplexes the reference beams $\lambda_1$ to $\lambda_n$ emanating from the beam sources 141 to 14n. The other combining means 18 is implemented as a beam splitter, for example, and applies the multiplexed reference beams from the combining means 16 to the transmission path 10. In the figure, the reference beams and signal beams are represented by solid arrows A1 and phantom arrows A2, respectively.

Figure 2:
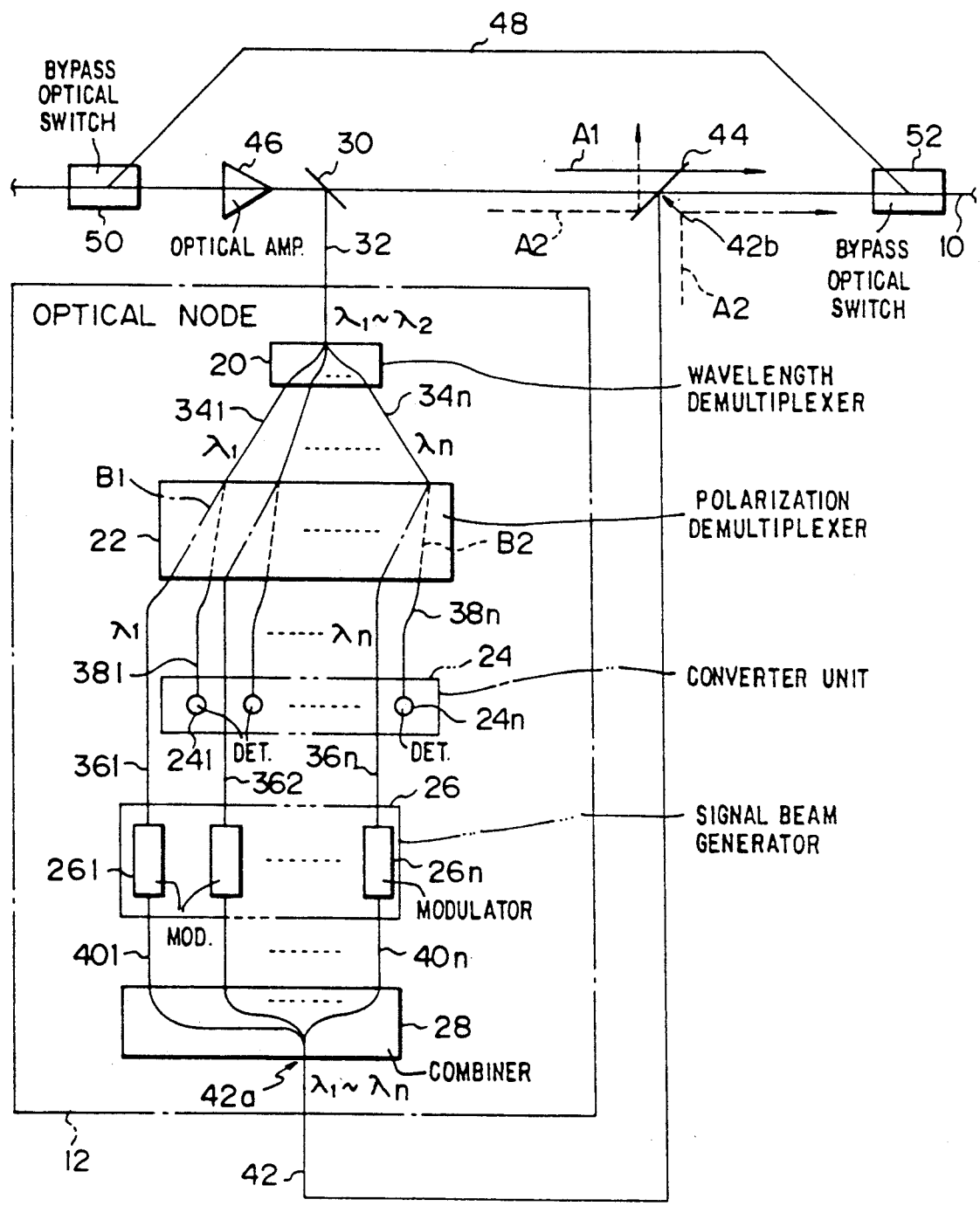
FIG. 2 is a schematic block diagram showing a specific construction for an essential part of the first embodiment.

FIG. 2 shows a specific construction for one of the optical nodes 12 and a part of the optical transmission path 10 which is coupled to the node 12. Transmission paths 32, 341 to 34n, 361 to 36n, 381 to 38n, 401 to 40n, and 42 which will be described, like the transmission path 10, preserve the directions of polarization of beams. As shown, the node 12 has wavelength demultiplexing means or demultiplexer 20 which demultiplexes the beams coming in over the transmission path 10 and containing both the multiplexed reference beams and the multiplexed signal beams, on the basis of wavelength. Polarization demultiplexing means or demultiplexer 22 demultiplexes the beams having different wavelengths into reference beams and signal beams on the basis of the direction of polarization. Signal beam converting means or converter unit 24 converts the signal beams into corresponding electric signals wavelength by wavelength. Signal beam generating means or generator 26 generates signal beams, each being tuned to the wavelength of a particular reference beam. Further, combining means or combiner 28 combines the signal beams having different wavelengths and feeds out the composite signal beams to the transmission path 10.

More specifically, the transmission path 10 is optically coupled to the wavelength demultiplexing means 20 via branching means 30 and the input transmission path 32. Comprising a half mirror, for example, the branching means 30 branches the multiplexed wavelength reference beams and signal beams to apply them to the transmission path 32. The wavelength demultiplexing mean 20 separates the multiplexed waveform reference beams and signal beams on a wavelength basis. This means 20 is coupled to the polarization demultiplexing means 22 via the transmission paths 341 to 34n, each of which is assigned to a particular wavelength and preserves the direction of polarization. The path 34i propagates a reference beam and a signal beam having substantially the same wavelength $\lambda_i$ (where i=1, 2, ..., n).

The polarization demultiplexing means 22 is constituted by a polarization beam splitter, for example, and further separates the reference beams and signal beams (after they have been separated wavelength by wavelength) into the reference beams and signal beams on the basis of the direction of polarization. This means 22 is optically coupled to the signal beam generating means 26 by the paths 361 to 36n and to the signal converting means 24 by the paths 381 to 38n. The associated paths 36i and 38i propagate reference beams having substantially the same wavelength $\lambda_i$ therethrough. In FIG. 2, the reference beams and signal beams separated by the polarization demultiplexing means 22 are indicated by dash-and dot lines B1 and dotted lines B2, respectively.

The signal converting means 24 has detector elements 241 to 24n, each being assigned to a particular wavelength. The elements 241 to 24n each receives a signal beam having a particular wavelength and transforms it into an electric signal. The signal beam generating means 26 has optical modulators 261 to 26n for modulating, for example, the intensity (luminance) of input beams. Each of optical modulators 261-26n modulates a reference beam of a particular wavelength to produce a signal beam. More specifically, the modulators 26 modulate the reference beams incident thereto to generate corresponding signal beams, i.e., signal beams which are tuned to the wavelengths of the associated input reference beams. The modulators 261 to 26n are coupled to the combining mean 28 by the paths 401 to 40n, each being assigned to a particular wavelength.

The combining means 28 combines and multiplexes the signal beams, each having a particular wavelength, to thereby output multiplexed wavelength signal beams. The combining means 28 is coupled to the transmission path 10 by the output transmission path 42 and combining mean 44. The combining means 44 is implemented as a polarization beam splitter, for example, and delivers the composite signal beams from the combining means 28 to the transmission path 10.

In the illustrative embodiment, since the signal beam generating means 26 is constituted by the optical modulators 261 to 26n, the direction of polarization of the signal beams coming out of the means 26 is substantially the same as that of the reference beams. Hence, polarization rotating means, not shown, is interposed between the signal beam generating means 26 and the combining means 44 for rotating the direction of polarization of the signal beams coming out of the means 26 such that it is substantially perpendicular to that of the reference beams. The output path 42, for example, may be used as such a polarization rotating means. Specifically, the path 42 is constituted by a PAND type polarization preserving fiber provided between the combining means 28 and 44, the combining means with its optical axis being twisted about itself. In such a configuration, the direction of polarization of signal beams from the combining means 28 as measured on the input end 42a and the direction of polarization of the signal beams incident to at the output surface end 42b are substantially perpendicular to each other.

In the illustrative embodiment, the combining means 44 is implemented as a polarization beam splitter, for example. Then, the reference beams A1 from the branching means 30 are transmitted through the combining means 44 to be propagated through the transmission path 10, while the signal beams A2 from the branching means 30 are intercepted by the combining means 44. The signal beam generating means 26 reproduces, on the basis of the output electric signals of the signal converting means 24, a part or all of the information carried by the plurality of signal beams routed thereto from the transmission path 10 via the branching means 30. The reproduced signals A2 are fed out to the transmission path 10 via the combining means 44 and are thereby transmitted to the next node 12.

All or part of the detector elements 241 to 24n of the signal converting means 24 are connected to an output section, not shown. The output section selects, from among the information carried by the plurality of signal beams, only the necessary information in response to the electric signals from the signal beam converting means 24. The necessary information selected may be displayed on a display or printed out by a printer, if desired. All or a part of the optical modulators 261 to 26n of the signal beam generating means 26 is are connected to an input section, not shown. The input section feeds electric signals is representative of information to be transmitted and entered on, for example, a keyboard to the signal beam generating means 26.

In this particular embodiment, an optical amplifier 46 is provided on the transmission path 10. For example, a single optical amplifier 46 is associated with each optical node 12. The amplifier 46 serves to compensate for the losses of reference and signal beams being propagated through the optical path 10, e.g. decreases in the power of the reference and signal beams.

Further, the illustrative embodiment has a bypass transmission path 48 associated with the transmission path 10. Specifically, the bypass transmission path 48 is connected at the input and output ends thereof to the path 10 by a 1×2 bypass optical switch 50 and a 2×1 bypass optical switch 52, respectively. This optically connects the part of the path 10 extending between the optical switches 50 and 52 to the optical node 12. If the node 12 fails, the reference and signal beams will be successfully propagated through the bypass path 48. As a result, the transmission of reference and signal beams to the subsequent node 12 is guaranteed.

SECOND EMBODIMENT

Figure 3:
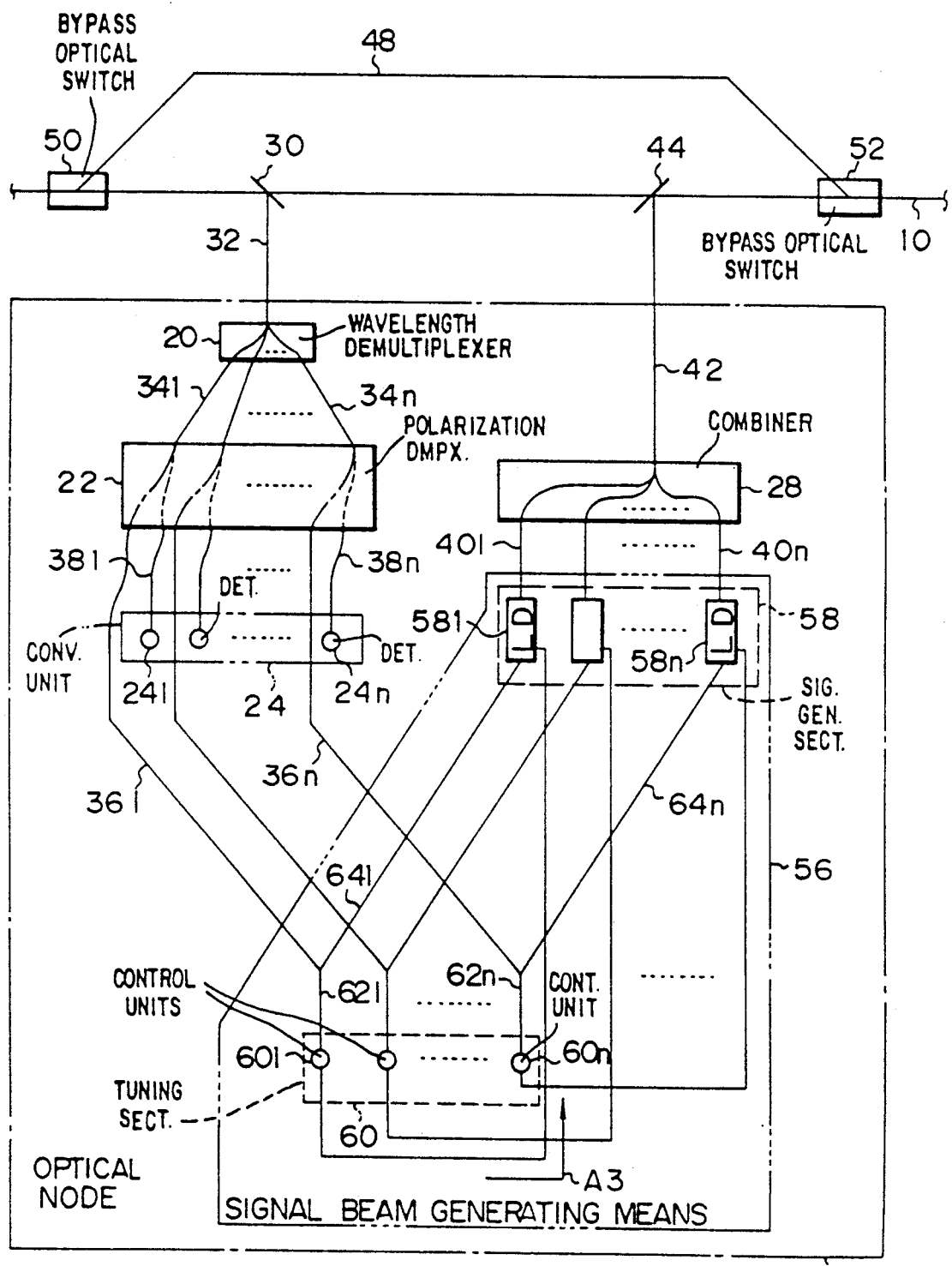
FIG. 3 is a schematic block diagram showing a specific construction for an essential part of a second embodiment of the present invention.

FIG. 3 shows an alternative embodiment of the present invention, and particularly a specific construction for an optical node and a part of a transmission path coupled to the node. In the figure, similar components are designated by like reference numerals that were used in FIG. 2, and redundant description will be avoided for simplicity. The second embodiment is essentially similar to the first embodiment except for the construction of the signal beam generating means, as follows.

As shown, the illustrative embodiment of an optical node 54 has a signal beam generating means 56. The signal beam generating means 56 is made up of a signal generating section 58 for generating signal beams and a tuning section 60 for producing control signals A3. The control signals A3 tune the wavelengths of the signal beams to those of the reference beams. The signal generating section 58 has variable-wavelength laser diodes (LD) 58 1 to 58n which are connected to the combining or combiner 28 by transmission paths 40 1 to 40n, respectively. The tuning section 60 has control units 60 1 to 60n, each being assigned to a particular wavelength. The units 60 1 to 60n are connected to 2×1 combining means 62 1 to 62n, respectively. These combining means are connected at one input thereof to the polarization demultiplexing means 22 by transmission paths 36 1 to 36n, respectively, and at the other input to the laser diodes 58 1 to 58n by transmission paths 64 1 to 64n, respectively. The combining means 62 1 to 62n and transmission paths 64 1 to 64n each preserves the direction of polarization.

The control unit 60i of a tuning section 60 receives the reference beam having the wavelength $\lambda_i$ and propagated through the transmission path 36i. It also receives a signal beam fed thereto from the laser diode 58i, and compares the received beams. Based on the result of the comparison, the unit 60i delivers to the laser diode 58i a control signal A3 for tuning the wavelength of the signal beam to be outputted by the laser diode LD 58i to the wavelength $\lambda_i$ of the reference beam. As a result, a signal beam whose wavelength is tuned to that of the reference beam is achieved. A part or all of the laser diodes 58 1 to 58n are connected to an input section, not shown, as was the case with the optical modulators 26 1 to 26 0 in FIG. 2.

THIRD EMBODIMENT

Figure 4:
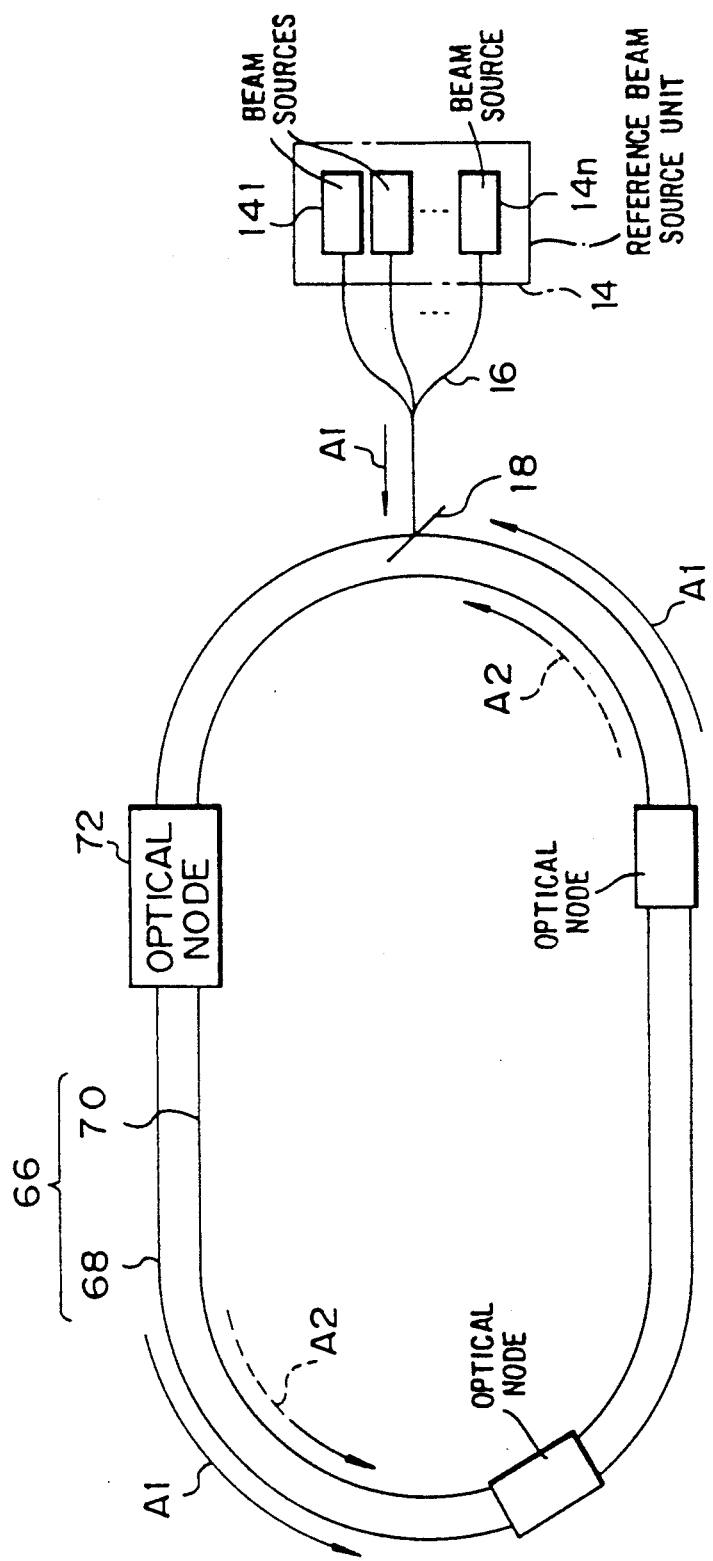
FIG. 4 is a schematic block diagram showing a third embodiment of the present invention.

FIG. 4 shows another alternative embodiment of the present invention schematically. In the figure, similar components are designated by the same reference numerals used in prior figures and redundant descriptions will be avoided for simplicity. This embodiment is essentially similar to the first embodiment except for the construction and arrangement of the optical path and the optical node.

As shown in FIG. 4, an optical transmission path 66 is optically connected to an optical node 72 and made up of an exclusive first transmission path portion 68 for reference beams A1 and an exclusive second transmission path portion 70 for signal beams A2. Each of transmission path portions 68 and 70 has a loop configuration. The optical node 72 is connected to both of the first and second transmission path portions 68 and 70. In this particular embodiment, therefore, the reference beams A1 and signal beams A2 may or may not be the same as each other with respect to the direction of polarization. The advantage attainable with such an path configuration is that the optical transmission path portions 68 and 70 can each be implemented with a single-mode optical fiber.

Figure 5:
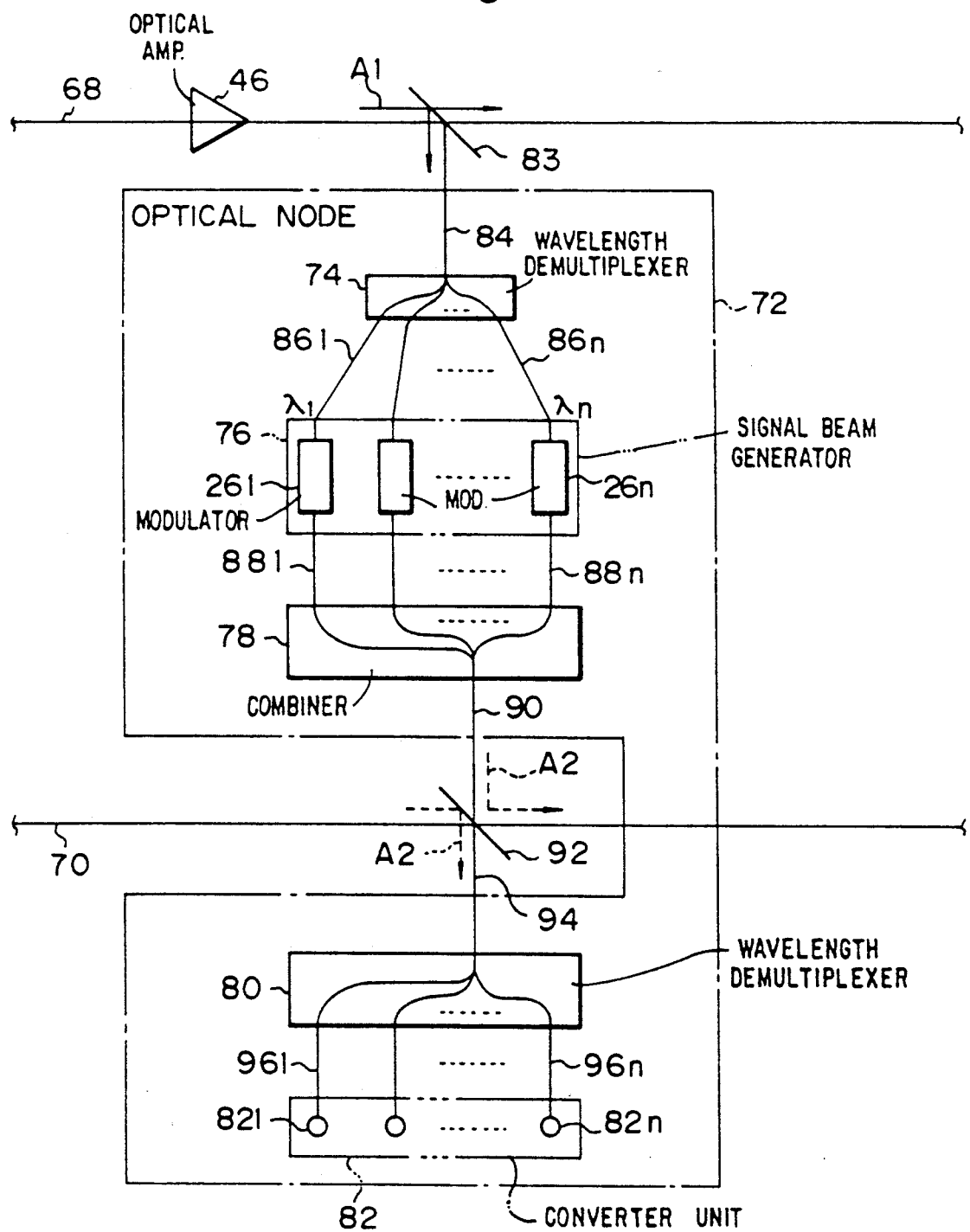
FIG. 5 is a schematic block diagram showing a specific construction for an essential part of the third embodiment.

FIG. 5 shows a specific construction of the optical node 72 and a part for the transmission path 66 optically connected to the node 72. As shown, the node 72 has first wavelength demultiplexing means or demultiplexer 74 for separating the reference beams A1 coming in over the transmission path portion 68 on a wavelength basis. Signal beam generating means or generator 76 generates a plurality of signal beams, each of which is tuned to the wavelength of the associated reference beams A1. Combining means or combiner 78 combines the signal beams having different wavelengths and sends out the resulting multiplexed wavelength signal beams A2 to the second transmission path portion 70. Second wavelength demultiplexing means or demultiplexer 80 demultiplexes the multiplexed wavelength signal beams A2 from the second transmission path portion 70 wavelength by wavelength. Signal converting means or converter unit 82 converts the signal beams into corresponding electric signals.

The first wavelength demultiplexing means 74 is optically connected to the first transmission path portion 68 by an input transmission path 84 and branching means 83. Implemented with a beam splitter, for example, the branching means 83 diverts optical energy from the multiplexed wavelength reference beams A1 from the first transmission path portion 68 to the wavelength demultiplexing means 74. The signal beam generating means 76 comprises optical modulators 26 1 to 26n which are connected to the wavelength demultiplexing means 74 by transmission paths 86 1 to 86n, respectively. The transmission path 86i carries the reference beam having the wavelength $\lambda_i$ therethrough, so that the optical modulator 26i receives the reference beam having the wavelength $\lambda_i$ from the wavelength demultiplexing means 74.

The combining means 78 has n×1 branches. The inputs of the combining means 78 are connected one-to-one to the optical modulators 26 1 to 26n by transmission paths 88 1 to 88n, each being of which is assigned to a particular wavelength. The transmission path 88i carries the signal beam whose wavelength is $\lambda_i$ therethrough. Hence, the combining means 78 combines the signal beams A2 fed from the modulators 261 to 26n and having the wavelengths $\lambda_1$ to $\lambda_n$ and outputs the resultant multiplexed wavelength signal beams. The output of the combining means 78 is connected to the second transmission path portion 70 by an output transmission path 90 and branching and combining means 92.

The branching and combining means 92 is constituted by an accessor or total reflector, for example. This means 92 serves two different functions, i.e., the function of feeding the signal beams A2 outputted by the combining means 90 to the second transmission path portion 70, and the function of applying the signal beams A2 transmitted from the preceding optical node to the second wavelength demultiplexing means 80. In this particular embodiment, the means 92 is implemented as a total reflector and prevents the signal beams A2 from the preceding optical node from advancing to the following optical node, while transmitting to the following node the signal beams A2 generated in response to the electric signals from the signal converting means 82 in the same manner as in the first embodiment. The second wavelength demultiplexing means 80 is connected to the second transmission path portion 70 by an input transmission path 94 and the branching and combining means 92.

The signal converting means 82 has detector elements 821 to 82n which are similar to the elements 241 to 24n of the first embodiment. The elements 821 to 82n are connected to the second wavelength demultiplexing means 80 by transmission paths 961 to 96n, respectively. The path 96i propagates the signal beam having the wavelength $\lambda_i$, so that the element 82i transforms it into an electric signal.

In the illustrative embodiment, the optical amplifier 46 is provided on the first transmission path portion 68 for the purpose of compensating for the losses of the reference beams A1 which propagate through the path portion 68.

FOURTH EMBODIMENT

Figure 6:
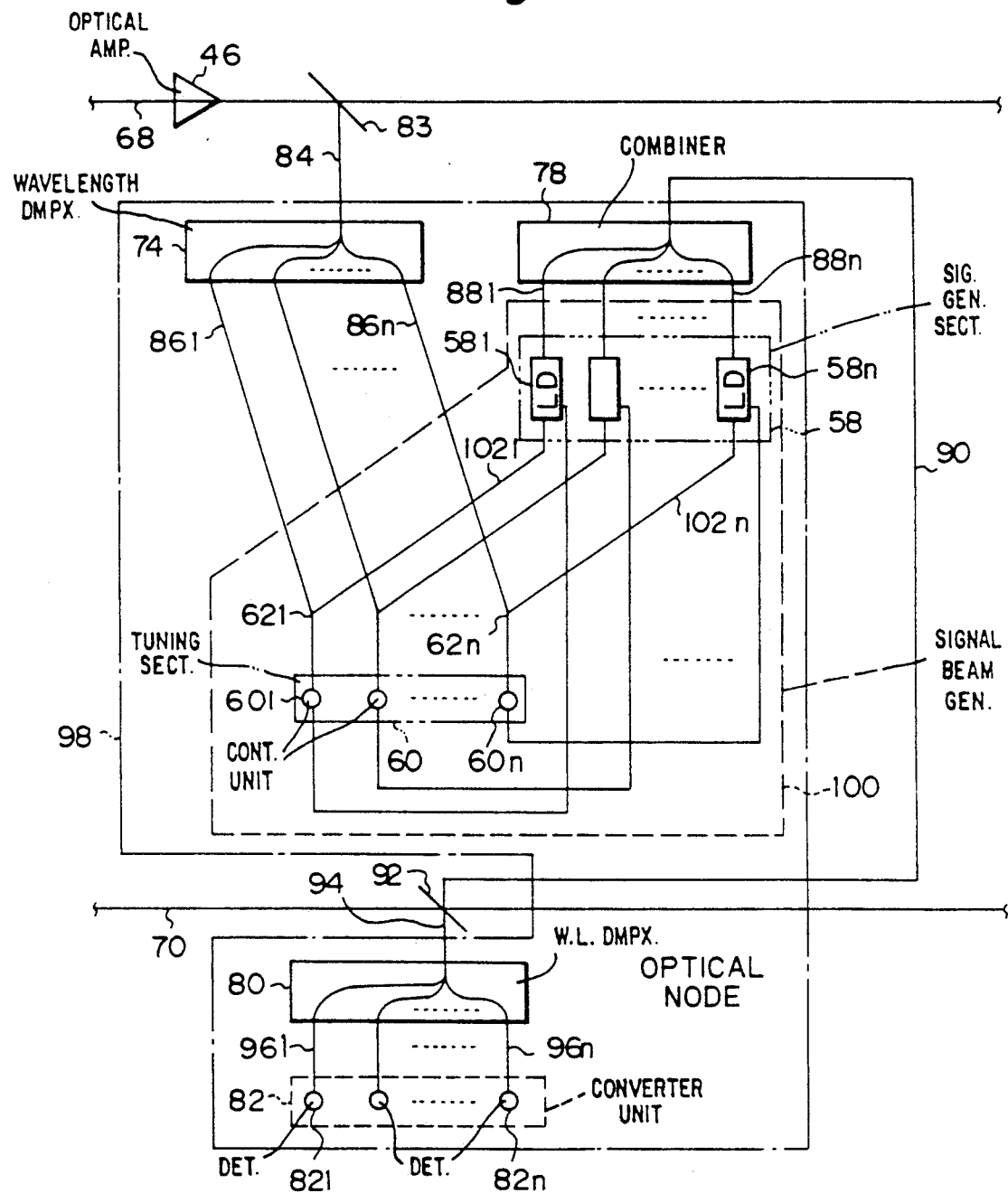
FIG. 6 is a schematic block diagram showing a specific construction for an essential part of a fourth embodiment of the present invention.

FIG. 6 shows another alternative embodiment of the present invention, and in particular a specific construction for an optical node 98 and the parts of the first and second transmission path portions 68 and 70 optically coupled to the node 98. In the figure, similar components are designated by the same reference numerals used in prior figures, and redundant descriptions will be avoided for simplicity. This embodiment is essentially similar to the third embodiment except for the construction of the signal beam generating means.

Specifically, as shown in FIG. 6, the optical node 98 has signal beam generating means or generator 100. In the illustrative embodiment, the signal beam generating means 100 is made up of the signal generating section 58 and tuning section 60. The signal generating section 58 has the laser diodes 581 to 58n optically connected to the coupling means 78 by the transmission paths 881 to 88n, respectively. The control units 601 to 60n constituting the tuning section 60 are connected to the 2×1 combining means 621 to 62n, respectively. The combining means 621 to 62n are connected at one end thereof to the first wavelength demultiplexing means or demultiplexer 74 by the transmission paths 861 to 86n, respectively, and at the other end to the laser diodes 581 to 58n by transmission paths 1021 to 102n, respectively.

In this embodiment, as in the second embodiment, a control unit 60i receives a reference beam having the wavelength $\lambda_i$ from the transmission path 86i and a signal beam from the laser diode 58i, compares them with respect to wavelength, and delivers, on the basis of the result of the comparison, a control signal to the laser diode 58i for tuning the wavelength of the signal beam issuing from laser diode 58i to the wavelength $\lambda_i$.

FIFTH EMBODIMENT

Figure 7:
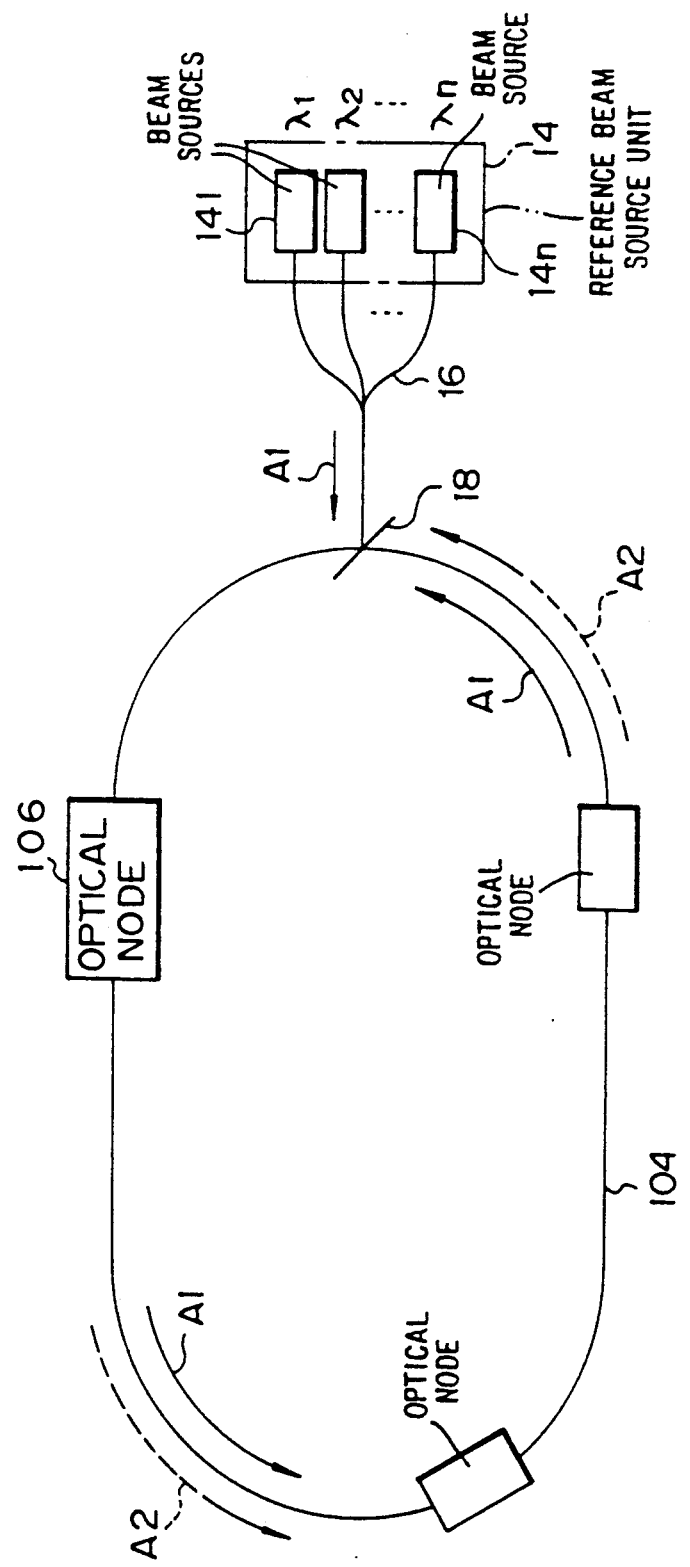
FIG. 7 is a schematic block diagram showing a fifth embodiment of the present invention.

FIG. 7 shows another alternative embodiment of the present invention schematically. In the figure, similar components are designated by the same reference numerals used in prior figures, and redundant descriptions will be avoided for simplicity. This embodiment differs from the first embodiment as to the construction of the optical node and in that the reference beams and signal beams have substantially the same direction of polarization.

Specifically, as shown in FIG. 7, an optical transmission path 104 is coupled to an optical node 106 and provided with a closed loop configuration. The reference beams A1 and signal beams A2, which are polarized in substantially the same direction propagate through the transmission path 104. Briefly, the reference beams A1 and signal beams A2 are transmitted on a time division basis, i.e., with a different time slot being assigned to each of the beams A1 and A2. The transmission path 104 is implemented as a path which preserves the direction of polarization of beams, e.g. an optical fiber.

Figure 8:
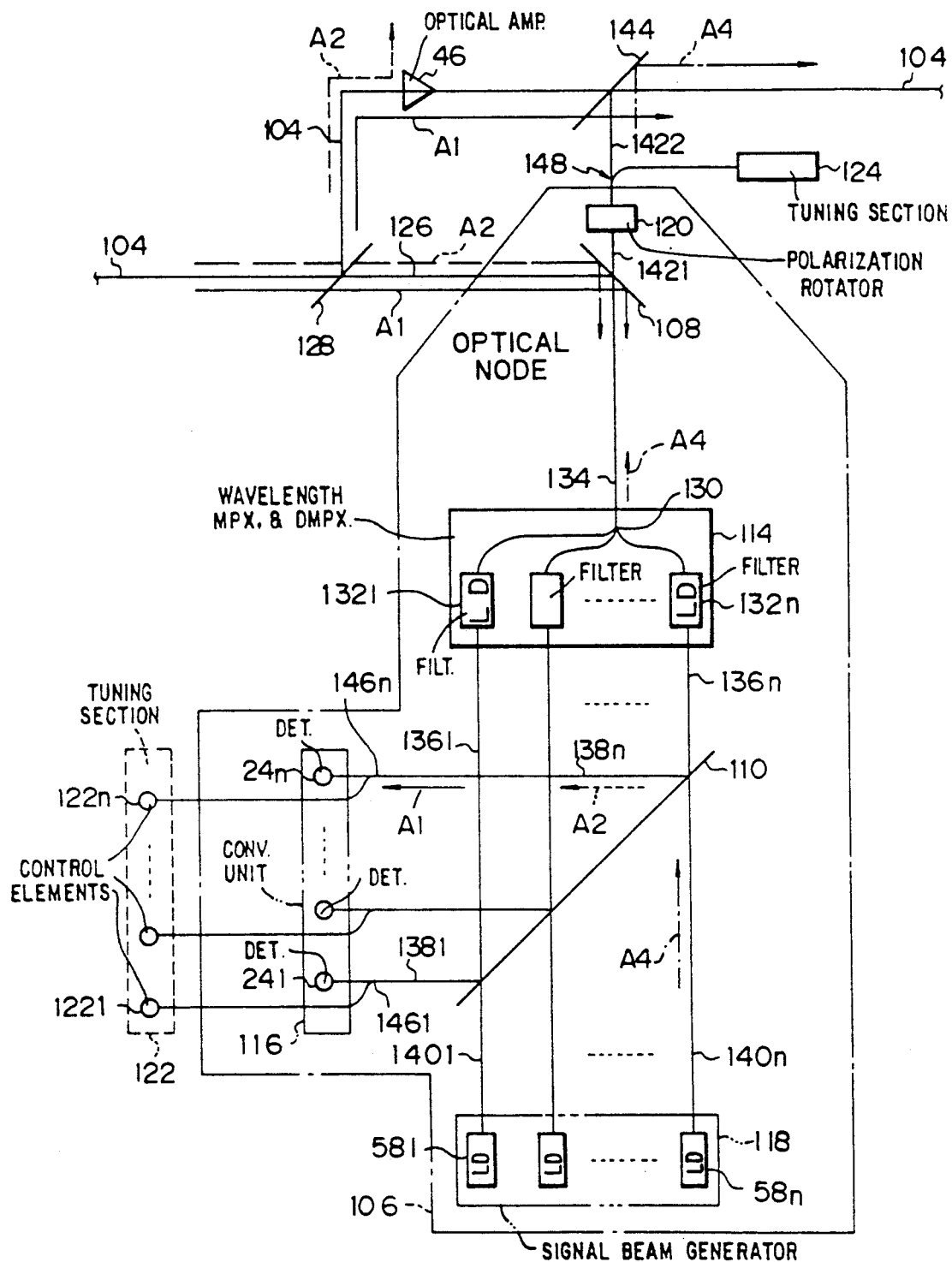
FIG. 8 is a schematic block diagram showing a specific construction for an essential part of the fifth embodiment.

FIG. 8 shows a specific construction of the optical node 106 and a part for the transmission path 104 connected to the node 106. It is to be noted that transmission paths 126, 130, 134, 1361 to 136n, 1381 to 138n, and 1401 to 140n which will be described, each preserves the direction of polarization just as the transmission path 104 does.

In this particular embodiment, the optical node 106 has a polarization beam splitter 108 which reflects beams polarized in a first direction while transmitting beams polarized in a second direction. A polarization beam splitter 110 succeeding the beam splitter 108 reflects beams polarized in the first direction while transmitting beams polarized in the second direction. Wavelength multiplexing and demultiplexing means 114 is interposed between the successive beam splitters 108 and 110 for multiplexing a plurality of beams each having a particular wavelength and demultiplexing multiplexed wavelength beams. Signal converting means or converter unit 116 converts into electric signals the signal beams A2 which were polarized in the first direction and reflected by the beam splitter 110. Signal beam generating means 118 generates signal beams A4 polarized in the second direction, wavelength by wavelength. Polarization rotating means or rotator 120 intervenes between the optical path 104 and the beam splitter 108 in order to change the direction of polarization of the signal beams polarized in the second direction and fed thereto from the signal beam generating means 118 to the first direction.

The illustrative embodiment further has a reference beam tuning section 122 for tuning the transmitting wavelengths of the wavelength multiplexing and demultiplexing means 114 to those of the reference beams when the node 106 demultiplexes multiplexed wavelength beams. A signal beam tuning section 124 tunes the wavelengths of the signal beams generated by the signal beam generating means 118 to the transmitting wavelengths of the wavelength multiplexing and demultiplexing mean 114.

The polarization beam splitter 108 is optically connected to the transmission path 104 by an input transmission path 126 and branching means 128. Implemented with a half mirror, for example, the branching means 128 branches the multiplexed wavelength reference beams or signal beams propagated through the transmission path 104 to the input transmission path 126. The beam splitter 108 reflects the reference beams or signal beams polarized in the first direction and coming in through the input transmission path 126. The reflected beams are conveyed to the wavelength multiplexing and demultiplexing means 114 via the transmission path 134.

The wavelength multiplexing and demultiplexing means 114 has 1×n branches and variable-wavelength filters 1321 to 132n, each being assigned to a particular wavelength. The inputs of the filters 1321 to 132n are connected to the transmission path 134 and, therefore, individually receive the multiplexed wavelength reference beams or signal beams propagated through the transmission path 134. Specifically, the variable-wavelength filter 132i separates the beam whose wavelength is $\lambda_i$ from the multiplexed waveform beams and sends it out.

The other polarization beam splitter 110 is connected to the variable-wavelength filters 1321 to 132n by, respectively, transmission paths 1361 to 136n, each being associated with a respective one of the wavelengths. The output beams of the filters 1321 to 132n having the wavelengths $\lambda_1$ to $\lambda_n$, respectively, have the first polarization direction. Hence, the beam splitter 110 reflects the reference beams or signal beams inputted from the filters 1321 to 132n and having the wavelengths $\lambda_1$ to $\lambda_n$.

The signal converting means 116, like the signal converting means 24 of the first embodiment, is made up of detector elements 241 to 24n. The elements 241 to 24n are connected to the second-stage beam splitter 110 by, respectively, the transmission paths 1381 to 138n, each of which carries a particular wavelength. The detector element 24i, therefore, converts the reference beam or signal beam reflected by the beam splitter 110 into an electric signal.

The signal beam generating means 118, like the signal beam generating means 58 of the second embodiment, is constituted by laser diodes 581 to 58n. The laser diodes 581 to 58n are connected to the polarization beam splitter 110 by, respectively, transmission paths 1401 to 140n, each being assigned to a particular wavelength. The laser diode 58i, therefore, outputs a signal beam having the wavelength $\lambda_i$ and polarized in the second direction. The wavelength $\lambda_i$ having the second polarization direction is transmitted through the beam splitter 110. The signal beam outputted from the laser diode 58i is routed through the transmission path 140i, beam splitter 110, transmission path 136i and variable-wavelength filter 132i to the branches 130.

The branches 130 receive the signal beams having the wavelengths $\lambda_1$ to $\lambda_n$ from the laser diodes 581 to 58n and multiplex them. The multiplexed signal beams from the laser diodes 581 to 58n are applied to the first-stage beam splitter 108 over the transmission path 134. The multiplexed wavelength signal beams are transmitted through the beam splitter 108 because they have the second polarization direction. The beam splitter 108 is connected to the transmission path 144 via an output transmission path 1422 and combining means 144.

The polarization rotating means 120 comprises a half-wave plate and rotates the second polarization direction of the signal beams fed thereto from the first-stage beam splitter 108 by 90 degrees to change it to the first polarization direction. Constituted by a beam splitter, for example, the combining means 144 combines the signal beams applied thereto from the polarization rotating mean 120 and having the first polarization direction and then sends them out to the transmission path 104.

The reference beam tuning section 122 and signal beam tuning section 124 are constructed and operated as follows.

The reference beam tuning section 122 has control elements 1221 to 122n. The reference beam having the wavelength $\lambda_i$ is fed from the transmission path 138i to the element 122i via the branches 146i. In response, the element 122i produces a control signal for controlling the transmission wavelength of the variable-wavelength filter 132i such that the optical power of the input reference beam whose wavelength is $\lambda_i$ becomes maximum. As a result, the transmission wavelength of the filter 132i is tuned to the wavelength $\lambda_i$ of the reference beam.

The signal beam tuning section 124 receives the signal beams having the wavelengths $\lambda_1$ to $\lambda_n$ via the branches 148. In response, the tuning section 124 produces a control signal for controlling the lasing wavelength of the laser diode 58i such that the optical power of the signal beam whose wavelength is $\lambda_i$ becomes maximum. Consequently, the lasing wavelength of the laser diode 58i is tuned to the transmission wavelength of the variable-wavelength filter 132i. It follows that signal beams whose wavelengths have been tuned to the reference beams are produced wavelength by wavelength.

The illustrative embodiment with the above-described optical nodes transmits signal beams and reference beams on a time division basis.

As shown in FIG. 8, the optical amplifier 46 is provided on the optical path 104 between the branching means 128 and the combining mean 144. The optical amplifier 46 receives the reference beams or signal beams from the branching means 128. When the reference beams are applied to the amplifier 46, the amplifier 46 amplifies them for compensating for the losses and then transmits the amplified reference beams to the following optical node. On the other hand, on receiving the signal beams from the branching means 128, i.e., from the preceding optical node, the amplifier 46 remains inoperative to simply remove them from the transmission path 104.

Again, as in the first embodiment, the signal beam generating means 118 reproduces the information carried by signal beams transmitted from the preceding optical node on the basis of the electric signals outputted by the associated signal converting means 116, the reproduced information being transmitted to the following optical node. The signal converting means 116 and signal beam generating means 118 are connected to an output and an input section, not shown, as in the first embodiment.

Figure 9:
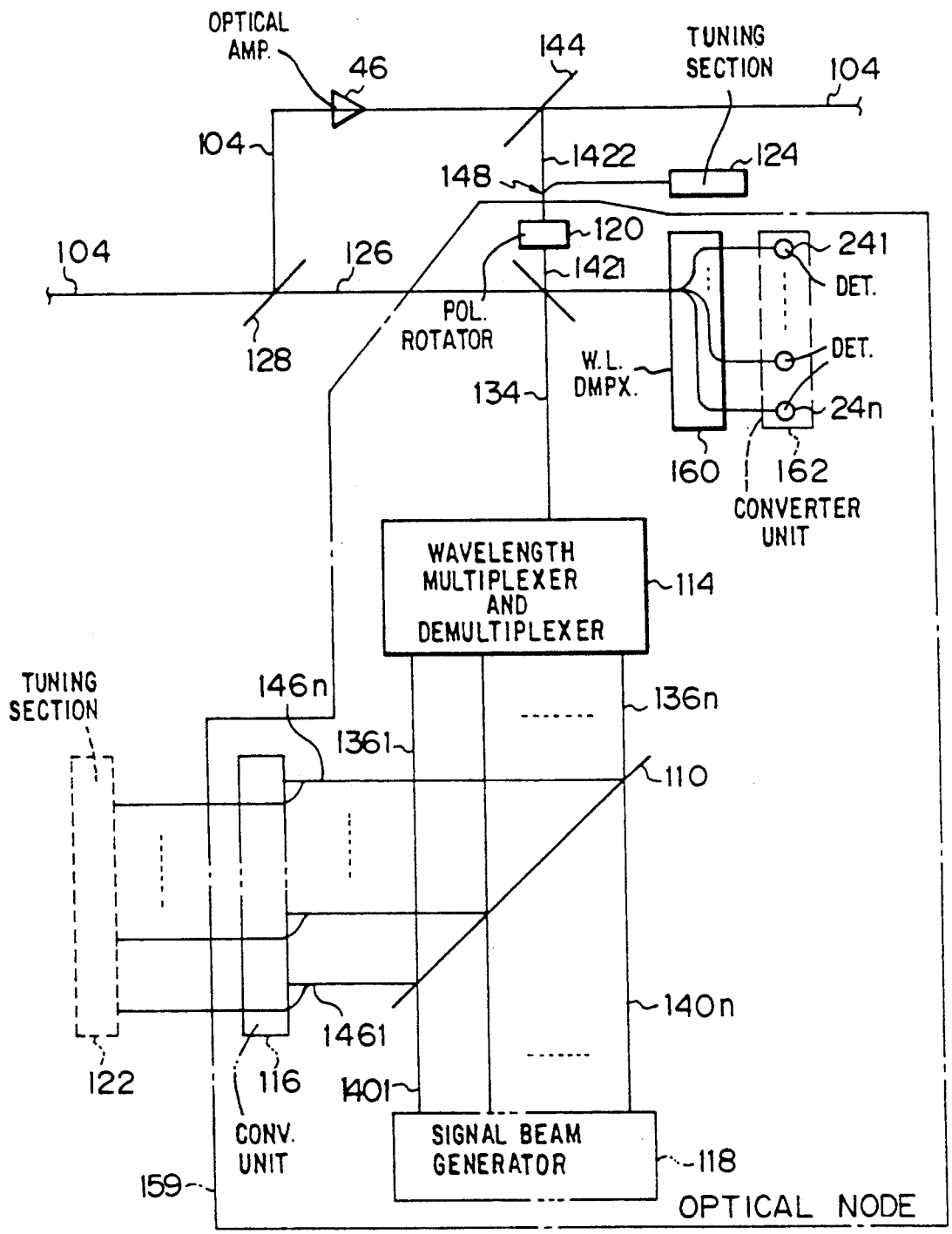
FIG. 9 is a schematic block diagram showing a modification of the fifth embodiment.

FIG. 9 shows a modified form of the optical node of the fifth embodiment schematically. In the figure numerals used in prior figures, similar components are designated by like reference numeals, and redundant description will be avoided for simplicity. As shown, the modified optical node, generally 159, has wavelength demultiplexing means or demultiplexer 160 for demultiplexing, on a wavelength basis, the multiplexed waveform signal beams applied thereto from the optical path 104 via the first-stage polarization beam splitter 108 and having the second polarization direction, i.e. signal beams from the preceding optical node. Another signal converting means or converter unit 162 is provided for converting into electric signals the beams, each having a particular wavelength and fed from the wavelength demultiplexing means 160.

The wavelength demultiplexing means 160 may be implemented with a plurality of filters each having a particular transmission wavelength. The signal converting means or converter unit 162, like the signal converting means 116, is made up of the detector elements 241 to 24n each being assigned to a beam having a particular wavelength.

In the modified embodiment, the reference beams and signal beams, sharing substantially the same direction of polarization, are also transmitted on a time division basis. However, when optical fibers, for example, are used as the optical transmission paths, it is not readily practicable to transmit beams (e.g. signal beams) while surely preserving their directions of polarization in the ideal state. Specifically, the signal beams are undesirably separated into two components whose polarization directions are perpendicular to each other. The fifth embodiment described previously can convert only one of the two separated components which has the first polarization direction, resulting in of signal beam losses.

In the modification of the fifth embodiment, the signal beams polarized in the second direction and, therefore, transmitted through the first-stage polarization beam splitter 108, are applied to the signal converting means 162 via the wavelength demultiplexing means 160 and are thereby converted into electric signals. The electric signals derived from the signal beams having the second polarization direction are superposed on the electric signals associated with the signal beams having the first polarization direction and outputted by the signal converting means 116, the composite signals being applied to an output section, not shown. This is successful in eliminating the losses of the signal beams and, therefore, in insuring operations which are not dependent on the polarization.

SIXTH EMBODIMENT

FIG. 10 shows another alternative embodiment of the present invention, and in particular an optical node 164 and a part of the optical path 104 coupled to the node 164. In the figure, similar components are designated by the same reference numerals used in prior figures, and redundant descriptions will be avoided for simplicity. This embodiment is essentially similar to the fifth embodiment except for the following points.

As shown in FIG. 10, the reference beams and signal beams are transmitted on a time division basis over the common optical transmission path 104. The polarization direction of the reference beams and that of the signal beams may or may not be the same as each other.

The optical node 164 has a first-stage polarization beam splitter 166 having a first direction of transmission, and a second-stage polarization beam splitter 168 having a second direction of transmission which intersects the first direction of transmission at an angle of 45 degrees. A Faraday rotator 170 is interposed between the beam splitters 166 and 168. The wavelength multiplexing and demultiplexing means 114 is located between the transmission path 104 and the beam splitter 166 for multiplexing a plurality of beams each having a particular wavelength and demultiplexing the multiplexed wavelength beams. A first-stage signal converting means or converter unit 116a converts the signal beams reflected by the first-stage polarization beam splitter 166 into electric signals. A second-stage signal converting means 116b converts the signal beams reflected by the second-stage beam splitter 168 into electric signals. The signal beam generating means 118 generates signal beams having a polarization direction coincident with the second direction of transmission, wavelength by wavelength. The reference beam tuning section 122 and signal beam tuning section 124 are also included in the node 164.

The wavelength multiplexing and demultiplexing means 114 is optically connected to the transmission path 104 via the input transmission path 126 and branching means 128. Implemented as a beam splitter, for example, the branching means 172 steers the multiplexed wavelength reference beams or the multiplexed wavelength signal beams propagated through the transmission path 104 to the wavelength multiplexing and demultiplexing means 114.

In the multiplexing and demultiplexing means 114, a variable-wavelength filter 132i separates the beam whose wavelength is $\lambda_i$ from the multiplexed wavelength beams and applies it to the first-stage beam splitter 166. In the beam having the wavelength $\lambda_i$, the component having a polarization direction different from the direction of the transmission axis of the beam splitter 166 (first direction of transmission) is reflected by the beam splitter 166. The first-stage signal converting means 116a comprises detector elements 241 to 24n, as in the fifth embodiment. The beam having the wavelength $\lambda_i$ and reflected by the beam splitter 116 is routed through transmission paths 172i and 174i to the element 24i of the signal converting means 116a.

In the beam having the wavelength $\lambda_i$ and separated by the filter 132i, the component whose polarization direction is coincident with the first direction of transmission is transmitted through the first-stage beam splitter 166 to reach the Faraday rotator 170. The beam splitter 166 is connected to the Faraday rotator 170 by a transmission path 175i. In response, the Faraday rotator 170 rotates the polarization direction of the incident beam whose wavelength is $\lambda_i$ to a direction which is deviated by, for example, 90 degrees from the direction of the transmission axis of the second-stage beam splitter 168 (second direction of transmission). As a result, the beam from the filter 132i and having the wavelength $\lambda_i$ is reflected by the beam splitter 168.

The second-stage signal converting means 116b comprises detector elements 241 to 24n, as in the fifth embodiment. The beam having the wavelength $\lambda_i$ and reflected by the second-stage beam splitter 168 is propagated through optical transmission paths 176i and 178i to the element 24i of the signal converting means 116b.

The signal beam generating means 118 is made up of the laser diodes 581 to 58n, as in the fifth embodiment. The signal beam issuing from the laser diode 58i and having the wavelength $\lambda_i$ has the polarization direction coincident with the second direction of transmission and is, therefore, transmitted through the second-stage beam splitter 168. The signal beam from the laser diode 58i and having the wavelength $\lambda_i$ is routed through the transmission paths 140i and 176i to the Faraday rotator 170. In response, the Faraday rotator 170 rotates the polarization direction of the incident signal beam by 90 degrees or 45 degrees, for example, and thereby changes the polarization direction of the incident beam to the first direction of transmission. Since the signal beam from the laser diode 58$i$ has a polarization direction coincident with the first direction of transmission, it is transmitted through the first-stage beam splitter 166 and reaches the branches 130 via the variable-wavelength filter 132$i$.

The branches 130 multiplex the signal beams emitted from the laser diodes 581 to 58$n$ and having the wavelengths $\lambda_1$ to $\lambda_n$, respectively. The multiplexed signal beams outputted by the branches 130 are fed out to the optical transmission path 104 via the transmission path 134, branching means 172, and combining means 144 and to the next optical node over the path 104.

In the illustrative embodiment, as in the fifth embodiment, the reference beam tuning section 122 is made up of control elements 1221 to 122$n$. The element 122$i$ receives the reference beam having the wavelength $\lambda_i$ from the transmission path 174$i$ via a 1×2 branch 180$i$ and a 2×1 branch 182$i$. The element 122$i$ further receives the reference beam having the wavelength $\lambda_i$ from the transmission path 178$i$ via a 1×2 branch 184$i$ and the branch 182$i$. As a result, the element 122$i$ receives reference beams which have been reflected by the first- and second-stage polarization beam splitters 166 and 168.

With this embodiment, it is possible to convert signal beams having different polarization directions into corresponding electric signals by applying such signal beams to the first- and second-stage signal converting means 116$a$ and 116$b$. The operation is, therefore, not dependent on the polarization.

SEVENTH EMBODIMENT

FIG. 11 shows another alternative embodiment of the present invention schematically. Briefly, this embodiment has a pair of (that is, a third and a fourth) closed-loop optical transmission path which are optically connected to each other at one or a plurality of suitable points by optical loop-back switches. Each loop-back switch is operable to transfer the optical signals from the third to the fourth optical transmission path and vice versa, as needed. Preferably, the third and fourth optical transmission paths should be connected at an even number of points. In the illustrative embodiment, the two transmission paths are connected at six points, and use is made of six optical loop-back switches.

Specifically, as shown in FIG. 11, the third and fourth closed-loop optical transmission paths 150 and 152 are provided as indicated by a dash-and-dot-and a dash-and-dots line, respectively. Branching means 153 has 1×2 branches, for example, and couples its input to the combining means 16 and its output to the optical transmission paths 150 and 154 via the combining means 18. The branching means 153, therefore, delivers the reference beams multiplexed by the combining means 18 to each of the optical transmission paths 150 and 152. In the illustrative embodiment, the reference and signal beams are propagated in one direction through the transmission path 150 and in the other direction through the transmission path 152.

Optical nodes 154 are distributed on the transmission paths 150 and 152. Optical loop-back switches 156 each connects the transmission paths 150 and 152 to each other at a given location. Reference beam removing means or removal units 158 each removes reference beams propagated substantially one round through the transmission path 150 or 152 from the same transmission path 150 or 152.

Assume that each optical node 154 is constructed to transmit reference and signal beams whose polarization directions are perpendicular to each other, as in the first or second embodiment. Then, each reference beam removing means 158 will be implemented as a polarization beam splitter so as to transmit or not to transmit beams, depending on the polarization direction. This allows the reference beam removing means 158 to intercept and thereby remove the reference beams propagated substantially one round through the transmission path 150 or 152.

On the other hand, assume that each optical node 154 transmits reference and signal beams on a time division basis, as in the fifth embodiment. Then, each reference beam removing means 158 will be implemented as an ON-OFF controlled optical switch, i.e., it will be turned off when reference beams are incident thereto and turned on when signal beams are incident thereto. With such a configuration, the reference beam removing means 158 transmits signal beams while removing reference beams having been routed through the paths 150 and 152 substantially one round.

In FIG. 11, assume that a disconnection has occurred at a point A on the optical transmission path 152 and/or a point B on the optical transmission path 150. Then, the optical loop-back switches a and b located at the opposite sides of the points A and B will cause the reference and signal beams to bypass the disconnected path or to return. Hence, optical communication between the nodes is insured despite the disconnection.

In summary, it will be seen that the present invention provides an optical switching system in which an optical node generates signal beams tuned to reference beams wavelength by wavelength, whereby the wavelengths of the signal beams (center wavelengths) involve a minimum of node-by-node scattering. This allows multiplexed wavelength signal beams having more closely spaced wavelengths than conventional to be transmitted over a common optical transmission path. Hence, the number of channels and, therefore, the transmission capacity, can be increased.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An optical switching system, comprising:
    an optical transmission path;
    a plurality of optical node means, each interconnected to the optical transmission path, for generating and receiving signal beams that have a first polarization direction and that propagate along the optical transmission path; and
    a reference beam source means, interconnected to the optical transmission path, for generating reference beams that have a second polarization direction and that propagate along the optical transmission path, each of the reference beams having a different wavelength,
    wherein each of the optical node means includes means for generating a plurality of signal beams, each signal beam generated by the means for generating being tuned to the wavelength of a respective one of the reference beams, and wherein the optical transmission path preserves the directions of polarization of the reference beams and the signal beams.

2. A switching system in accordance with claim 1, wherein said optical transmission path has a closed loop configuration.

3. A switching system in accordance with claim 1, further comprising optical amplifiers provided on said optical transmission path.

4. A switching system in accordance with claim 1,
wherein the signal beams include input signal beams and output signal beams, the output signal beams being generated by the means for generating;
wherein each of said optical node means further comprises means for receiving a plurality of input signal beams, each input signal beam having a wavelength that is tuned to the wavelength of a respective one of the reference beams, the means for receiving including
wavelength demultiplexing means for demultiplexing beams coming in over said optical transmission path on a wavelength basis,
polarization demultiplexing means for demultiplexing beams each having a particular wavelength into reference beams and input signal beams on a polarization direction basis, and
signal converting means for converting the input signal beams into electric signals wavelength by wavelength; and
wherein the means for generating further comprises combining means for combining the output signal beams and feeding out said combined output signal beams to said optical transmission path.

5. An optical switching system, comprising:
an optical transmission path for propagating signal beams therethrough;
a plurality of optical node means, each interconnected to the optical transmission path, for generating and receiving signal beams; and
a reference beam source means, interconnected to the optical transmission path, for generating reference beams, each of the reference beams having a different wavelength,
wherein each of the optical node means includes means for generating a plurality of signal beams, each signal beam generated by the means for generating being tuned to the wavelength of a respective one of the reference beams, and
wherein said optical transmission path includes a first transmission path portion and a second transmission path portion exclusively assigned to the reference beams and the signal beams, respectively.

6. A switching system in accordance with claim 5, further comprising optical amplifiers provided on said first transmission path portion.

7. A switching system in accordance with claim 5,
wherein the signal beams include input signal beams and output signal beams, the output signal beams being generated by the means for generating;
wherein said means for generating further comprises
first wavelength demultiplexing means for demultiplexing the reference beams coming in over said first transmission path portion on a wavelength basis, and
combining means for combining the output signal beams and feeding out said combined output signal beams to said second transmission path portion; and
wherein each of said optical node means further comprises means for receiving a plurality of input signal beams, each input signal beam having a wavelength that is turned to the wavelength of a respective one of the reference beams, the means for receiving including
second wavelength demultiplexing means for demultiplexing the input signal beams coming in over said second transmission path portion on a wavelength basis, and
signal converting means for converting the demultiplexed input signal beams into electric signals wavelength by wavelength.

8. A switching system in accordance with claim 5, wherein each of said first and second transmission path portions has a closed loop configuration.

9. An optical switching system, comprising:
an optical transmission path for propagating signal beams therethrough;
a plurality of optical node means, each interconnected to the optical transmission path, for generating and receiving signal beams; and
a reference beam source means, interconnected to the optical transmission path, for generating reference beams, each of the reference beams having a different wavelength,
wherein each of the optical node means includes means for generating a plurality of signal beams, each signal beam generated by the means for generating being tuned to the wavelength of a respective one of the reference beams, and
wherein the reference beams and the signal beams are time division multiplexed and propagate along the optical transmission path.

10. A switching system in accordance with claim 9,
wherein the signal beams include input signal beams and output signal beams, the output signal beams being generated by the means for generating;
wherein each of said optical node means further comprises means for receiving a plurality of input signal beams, each input signal beam having a wavelength that is tuned to the wavelength of a respective one of the reference beams, the means for receiving including
a first-stage polarization beam splitter means for reflecting beams polarized in a first direction while transmitting beams polarized in a second direction, the input signal beams having components that are polarized in the first direction,
a second-stage polarization beam splitter means for reflecting beams polarized in the first direction while transmitting beams polarized in the second direction,
wavelength multiplexing and demultiplexing means provided between said first- and second-stage polarization beam splitter means for multiplexing a plurality of beams each having a particular wavelength and demultiplexing multiplexed wavelength beams, and
signal converting means for converting input signal beams fed from said second-stage polarization beam splitter means into electric signals; and
wherein the means for generating further comprises
signal beam generator means for generating output signal beams that are polarized in the first direction, the output signal beams passing through the second-stage polarization beams splitter means, the wavelength multiplexing and demultiplexing means, and the first stage polarization beam splitter means, and polarization rotating means provided between said optical transmission path and said first-stage polarization beam splitter means for changing the polarization direction of the output signal beams to the first direction.

11. A switching system in accordance with claim 10, wherein the input signal beams additionally have components that are polarized in the second direction, and wherein each of said means for receiving further comprises wavelength demultiplexing means for demultiplexing the components of the input signal beams that are polarized in the second direction and that come in over said optical transmission path via said first-stage polarization beam splitter means on a wavelength basis; and a second signal converting means for converting the beams demultiplexed by said wavelength demultiplexing means into electric signals.

12. A switching system in accordance with claim 9, wherein the signal beams include input signal beams and output signal beams, the output signal beams being generated by the means for generating;

wherein each of said optical node means further comprises means for receiving a plurality of input signal beams, each input signal beam having a wavelength that is tuned to the wavelength of a respective one of the reference beams, the means for receiving including a first-stage polarization beam splitter having a first transmission direction, a second-stage polarization beam splitter having a second transmission direction which intersects the first transmission direction at an angle of 45 degrees, a Faraday rotator provided between said first- and second-stage polarization beam splitters, wavelength multiplexing and demultiplexing means provided between said optical transmission path and said first-stage polarization beam splitter for multiplexing a plurality of beams each having a particular wavelength and demultiplexing multiplexed wavelength beams, first-stage signal converting means for converting input signal beams reflected by said first-stage polarization beam splitter into electric signals, and second-stage signal converting means for converting the signal beams reflected by said second-stage polarization beam splitter into electric signals; and wherein the means for generating a plurality of signal beams provides signal beams that are polarized in the second transmission direction.

13. A switching system in accordance with claim 9, further comprising optical amplifiers provided on said optical transmission path.

14. A switching system is accordance with claim 9, wherein said optical transmission path has a closed loop configuration.

* * * * *